United States Patent
Austrheim et al.

(10) Patent No.: US 11,161,690 B2
(45) Date of Patent: Nov. 2, 2021

(54) STORAGE SYSTEM VEHICLE

(71) Applicant: Autostore Technology AS, Nedre Vats (NO)

(72) Inventors: Trond Austrheim, Etne (NO); Børge Bekken, Haugesund (NO)

(73) Assignee: Autostore Technology AS, Nedre Vats (NO)

(*) Notice: Subject to any disclaimer, the term of this patent is extended or adjusted under 35 U.S.C. 154(b) by 139 days.

(21) Appl. No.: 16/474,644

(22) PCT Filed: Jan. 2, 2018

(86) PCT No.: PCT/EP2018/050064
§ 371 (c)(1),
(2) Date: Jun. 28, 2019

(87) PCT Pub. No.: WO2018/137898
PCT Pub. Date: Aug. 2, 2018

(65) Prior Publication Data
US 2019/0322452 A1 Oct. 24, 2019

(30) Foreign Application Priority Data
Jan. 30, 2017 (NO) .................................. 20170141

(51) Int. Cl.
*B65G 1/04* (2006.01)
*B65G 1/137* (2006.01)

(52) U.S. Cl.
CPC ......... *B65G 1/0492* (2013.01); *B65G 1/1373* (2013.01)

(58) Field of Classification Search
CPC combination set(s) only.
See application file for complete search history.

(56) References Cited

U.S. PATENT DOCUMENTS

2001/0038784 A1* 11/2001 Peltomaki ............ B65G 1/0464
414/273
2012/0195724 A1* 8/2012 Toebes ..................... B65G 7/00
414/509
(Continued)

FOREIGN PATENT DOCUMENTS

EP 0760411 A1 3/1997
EP 3050824 A1 8/2016
(Continued)

OTHER PUBLICATIONS

International Search Report issued in Application No. PCT/EP2018/050064, dated Mar. 28, 2018 (7 pages).
(Continued)

*Primary Examiner* — Kyle O Logan
(74) *Attorney, Agent, or Firm* — Osha Bergman Watanabe & Burton LLP

(57) ABSTRACT

A remotely operated vehicle for picking up storage bins from an underlying storage system includes a vehicle lifting device for lifting the storage bin from the underlying storage system, a first vehicle rolling assembly including a first rolling set and a second rolling set arranged at opposite sides of a vehicle frame, allowing movement of the vehicle along a first direction (X) on the underlying storage system during use, a second vehicle rolling assembly including a first rolling set and a second rolling set arranged at opposite sides of the vehicle frame, allowing movement of the vehicle along a second direction (Y) on the underlying storage system during use, the second direction (Y) being perpendicular to the first direction (X), and a rolling set displacement assembly arranged to move the first vehicle rolling assembly in a vertical direction (Z) between a first position and a second position. The first vehicle rolling assembly allows movement of the vehicle along the first direction (X). The second vehicle rolling assembly allows movement of (Continued)

the vehicle along the second direction (Y). Each of said rolling sets includes at least a first wheel and a second wheel rigidly interconnected by a wheel connecting element. The wheel connecting element of the first rolling set of the first vehicle rolling and the wheel connecting element of the first rolling set of the second vehicle rolling assembly are pivotally connected to the vehicle frame, such that each of said first rolling sets may tilt in a vertical plane.

11 Claims, 9 Drawing Sheets

(56) References Cited

U.S. PATENT DOCUMENTS

| | | | |
|---|---|---|---|
| 2015/0084301 A1 | 3/2015 | Johnson | |
| 2015/0127143 A1* | 5/2015 | Lindbo | B65G 1/0464 |
| | | | 700/218 |
| 2016/0145058 A1* | 5/2016 | Lindbo | B65G 1/0485 |
| | | | 700/218 |
| 2016/0311616 A1 | 10/2016 | Lindblom | |
| 2016/0325932 A1* | 11/2016 | Hognaland | B65G 1/0478 |
| 2017/0355524 A1* | 12/2017 | Hognaland | B65G 1/0478 |
| 2018/0043528 A1* | 2/2018 | Lindbo | B25J 9/0093 |
| 2018/0065804 A1* | 3/2018 | Hognaland | B65G 1/0464 |
| 2018/0148259 A1* | 5/2018 | Gravelle | B65G 1/0464 |

FOREIGN PATENT DOCUMENTS

| | | |
|---|---|---|
| GB | 1086917 A | 10/1967 |
| JP | H06-1309 U | 1/1994 |
| NO | 317366 B1 | 10/2004 |
| WO | 98/49075 A1 | 11/1998 |
| WO | 2013/167907 A1 | 11/2013 |
| WO | 2013/179386 A1 | 12/2013 |
| WO | 2015/088422 A1 | 6/2015 |
| WO | 2015/193278 A1 | 12/2015 |
| WO | 2016/120075 A1 | 8/2016 |

OTHER PUBLICATIONS

Written Opinion issued in International Application No. PCT/EP2018/050064, dated Mar. 28, 2018 (10 pages).
International Preliminary Report on Patentability issued in Application No. PCT/EP2018/050064, dated Apr. 30, 2019 (16 pages).
Search Report issued in Norwegian Application No. 20170141, dated Aug. 30, 2017 (2 pages).

* cited by examiner

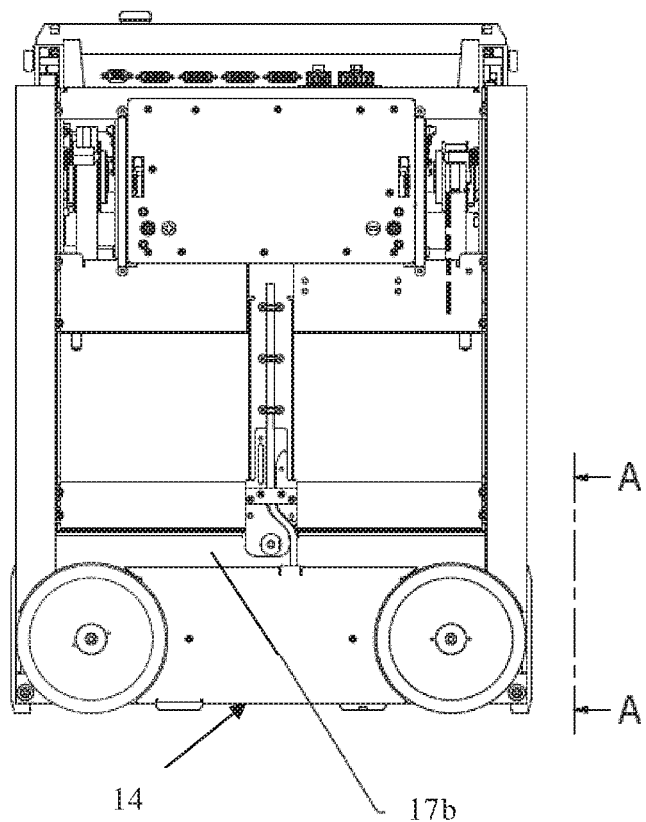
Fig. 6
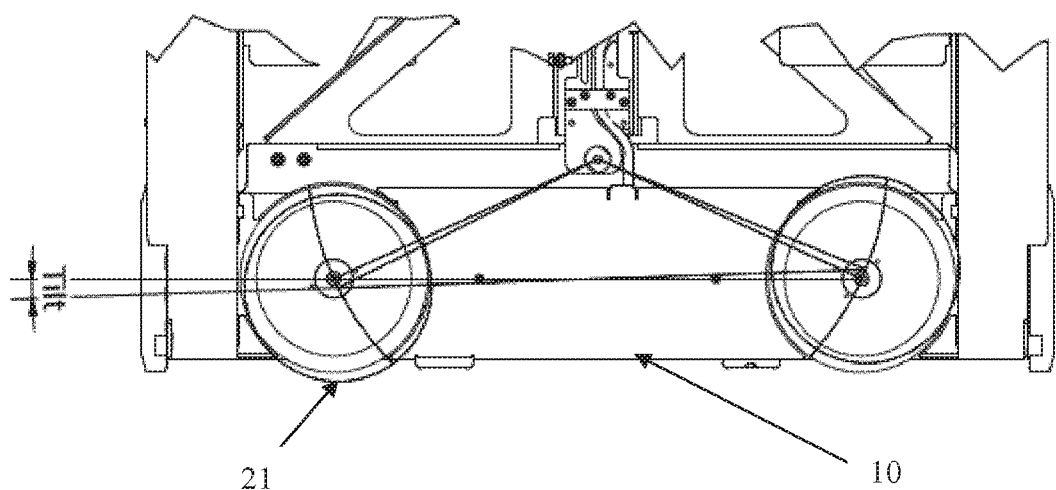
Fig. 7 (A-A)

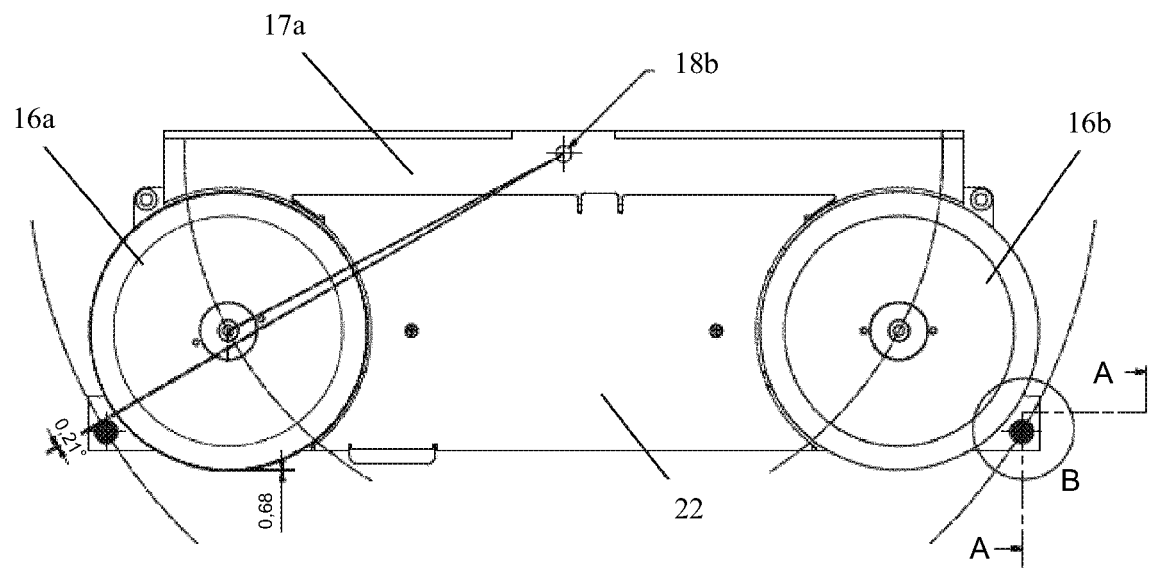
Fig. 8
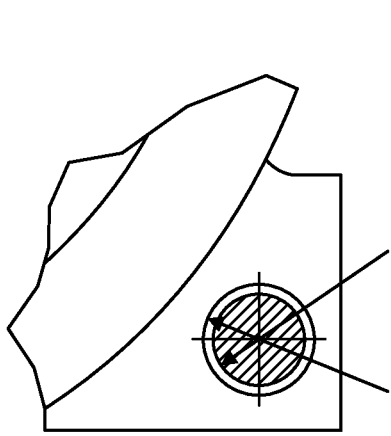
Fig. 9 (B)
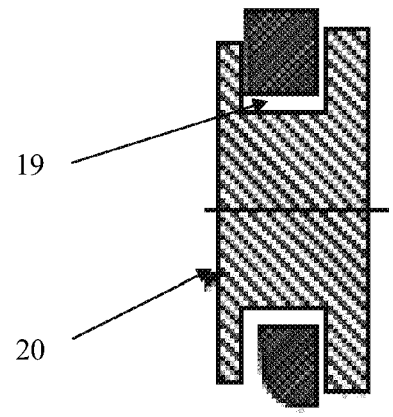
Fig. 10 (A-A)

STORAGE SYSTEM VEHICLE

FIELD OF THE INVENTION

The present invention relates to a remotely operated vehicle, or robot, for picking up storage bins from a storage system, and a storage system comprising such a vehicle.

BACKGROUND

A remotely operated vehicle for picking up storage bins from a storage system is known. A detailed description of a relevant prior art storage system is presented in WO 98/49075, and details of a prior art vehicle being suitable for such a storage system is disclosed in Norwegian patent NO317366. Such prior art storage systems comprise a three-dimensional storage grid containing storage bins that are stacked on top of each other up to a certain height.

An example of a prior art storage system 1 is illustrated in FIGS. 1 and 2. The bin storage grid is constructed by vertical aluminium beams/profiles 2 forming multiple storage columns. The vertical aluminium beams/profiles are interconnected by top rails 3, onto which a plurality of remotely operated vehicles 4, or robots, are arranged to move laterally. Each vehicle is equipped with a lift 9 for picking up, carrying, and placing bins that are stored in the storage grid, and a rechargeable battery in order to supply electrical power to a vehicle incorporated motor. Each vehicle typically communicates with a control system via a wireless link and is recharged at a charging station when needed.

The vehicles or robots 4 are configured to move in X and Y directions (see Cartesian coordinate system 100) on the top rails 3, and to receive a storage bin 5 from a storage column within a bin storing grid 6. The prior art storage system 1 may also include a dedicated bin lift device 7, the latter being arranged to receive a storage bin 5 from a vehicle 4 at the top level of the storage system 1 and to convey the storage bin 5 down in a vertical direction to a delivery station, or port 8.

Local height differences of the floor onto which the storage system is placed will be translated to the dedicated support rails 3 via the aluminium beams/profiles 2. Even by carefully adjusting the level of the aluminium beams/profiles, slight height differences will normally be present. Due to the slight height differences, at least some of the support rail squares surrounding a storage column will comprise a support rail intersection having a slightly different height from the others.

The applicant has recently developed an advantageous vehicle/robot, wherein each of the wheels are driven independently by having an electric motor for each wheel.

Such vehicles are disclosed in WO 2016/120075 A1. Because of the independent wheel drive, a loss of traction due to the slight height differences discussed above may lead to a temporary wheel spin. Such wheel spin is controlled by an electronic anti-spin system. However, extensive wheel spin and use of the anti-spin system is not optimal in view of for instance durability of the wheel components.

The present invention provides a vehicle that may retain the many advantages of having independently driven wheels, while avoiding excessive wheel spin and use of the electronic anti-spin system.

SUMMARY OF THE INVENTION

The present invention is defined by the appended claims and in the following:

In a first aspect, the present invention provides a remotely operated vehicle for picking up storage bins from an underlying storage system, comprising
  a vehicle lifting device for lifting the storage bin from the underlying storage system,
  a first vehicle rolling assembly comprising a first rolling set and a second rolling set arranged at opposite sides of a vehicle frame, allowing movement of the vehicle along a first direction on the underlying storage system during use,
  a second vehicle rolling assembly comprising a first rolling set and a second rolling set arranged at opposite sides of the vehicle frame, allowing movement of the vehicle along a second direction on the underlying storage system during use, the second direction being perpendicular to the first direction, and
  a rolling set displacement assembly arranged to move the first vehicle rolling assembly in a vertical direction between a first position, wherein the first vehicle rolling assembly allow movement of the vehicle along the first direction, and a second position, wherein the second vehicle rolling assembly allow movement of the vehicle along the second direction, wherein each of said rolling sets comprises at least a first wheel and a second wheel rigidly interconnected by a wheel connecting element, and
  wherein the wheel connecting element of the first rolling set of the first vehicle rolling assembly and the wheel connecting element of the first rolling set of the second vehicle rolling assembly are pivotally connected to the vehicle frame, such that each of said first rolling sets may tilt in a vertical plane.

In other words, by having the wheel connecting elements of the first rolling sets pivotally connected, each of said wheel connecting elements, and consequently the corresponding first rolling sets and their respective first and second wheels, may tilt/pivot relative to the vehicle frame, in the vertical plane.

When a pivotally connected wheel connecting element tilts in a vertical plane, as described above, the first and the second wheel of the wheel connecting element will be moved in opposite vertical directions, i.e. the wheel connecting elements are pivotally connected such that the first and the second wheel of the wheel connecting element of each of said first rolling sets may tilt in a vertical plane and move in opposite vertical directions. The wheel connecting elements are preferably pivotally connected at a pivot point arranged equidistant from the respective first and second wheel.

In one embodiment of the vehicle, the wheel connecting element of the first rolling set of the first vehicle rolling assembly is pivotally connected to the vehicle frame via the rolling set displacement assembly. Preferably, the wheel connecting element of the first rolling set of the first vehicle rolling assembly is pivotally connected to the rolling set displacement assembly.

In one embodiment of the vehicle, the wheel connecting element of the second rolling set of the first vehicle rolling assembly is rigidly connected to the rolling set displacement assembly.

In one embodiment of the vehicle, the wheel connecting element of the second rolling set of the second vehicle rolling assembly is rigidly connected to the vehicle frame.

By being rigidly connected, the wheel connecting elements of the second rolling sets are not able to tilt/pivot in a vertical plane.

In one embodiment of the vehicle, the wheel connecting element of the first rolling set of the first vehicle rolling assembly may tilt in a vertical plane parallel to the first direction.

In one embodiment of the vehicle, the wheel connecting element of the first rolling set of the second vehicle rolling assembly may tilt in a vertical plane parallel to the second direction.

In one embodiment of the vehicle, the tilt of the wheel connecting element of the first rolling set of the first vehicle rolling assembly and the first rolling set of the second vehicle rolling assembly are limited by a tilt limiting assembly. The tilt is preferably limited such that a lowermost contact surface of the wheels of the first or the second vehicle rolling assembly is always kept below the level of a lowermost part of the vehicle frame when the first or the second rolling assembly are used to drive the vehicle.

In one embodiment of the vehicle, the tilt limiting assembly is arranged to prevent a lowermost contact surface, of the wheels of the first rolling set driving the vehicle, from tilting above the level of a lowermost part of the vehicle frame.

In one embodiment of the vehicle, the tilt limiting assembly comprises a first limiting element on each of the wheel connecting elements of the first rolling set of the first and of the second vehicle rolling assembly, and a cooperating second limiting element on each of the rolling set displacement assembly and the vehicle frame. The first and the second limiting elements have cooperating limiting surfaces which interact when the wheel connecting element of the first rolling set of the first or of the second vehicle rolling assembly is at a maximum tilt.

In one embodiment of the vehicle, the first limiting element is a hole and the second limiting element is a knob arranged in the hole, the hole having a circumference (i.e. a limiting surface) larger than the circumference (i.e. a cooperating limiting surface) of the knob, such that the knob may move a given distance relative to the hole. The movement being limited by the circumference of the hole. The hole may also be termed a recess or through-hole depending on the its shape.

In one embodiment of the vehicle, the wheel connecting element of the first rolling set of the first vehicle rolling assembly and the second vehicle rolling assembly is pivotally connected at a first pivot point and a second pivot point, respectively, the first and the second pivot point being equidistant from the centre axis of the first and the second wheel of the respective rolling set.

In one embodiment of the vehicle, each wheel is independently driven by a motor, preferably each wheel is driven by a separate electric motor.

In a second aspect, the present invention provides a storage system comprising a vehicle according to the first aspect of the invention, the storage system comprises a bin storage structure having a plurality of storage columns for accommodating a vertical stack of storage bins and a horizontal grid of top rails, upon which rails the vehicle may move in two perpendicular directions above the storage columns.

In the present application, the term "wheel connecting element" is intended to encompass any type of element, part or assembly able to ensure that the first and the second wheel of a specific rolling set is held in a fixed position relative to each other. In some embodiments, the wheel connecting element may for instance be an integral part of the frame, the rolling set displacement assembly or similar. Further, the wheel connecting elements of the first and second rolling sets of a specific vehicle may be similar or different.

SHORT DESCRIPTION OF THE DRAWINGS

The present invention is described in detail by reference to the following drawings:

FIGS. 4 to 6 are side views of the vehicle in FIG. 3.

FIG. 7 is an enlarged view of FIG. 5, showing the pivotable rolling set in more detail.

FIG. 8 is a side view of a pivotable rolling set.

FIG. 9 is a side view of a pivot limitation assembly.

FIG. 10 is a cross-sectional view of the pivot limitation assembly.

DETAILED DESCRIPTION OF THE INVENTION

All relative terms used to describe the inventive vehicle such as upper, lower, lateral, vertical, X-direction, Y-direction, Z-direction, etc., shall be interpreted using the above mentioned prior art storage system (FIG. 1) as reference system. For the sake of clarity, the X, Y and Z-directions are illustrated by a Cartesian coordinate when appropriate.

Figure 1:
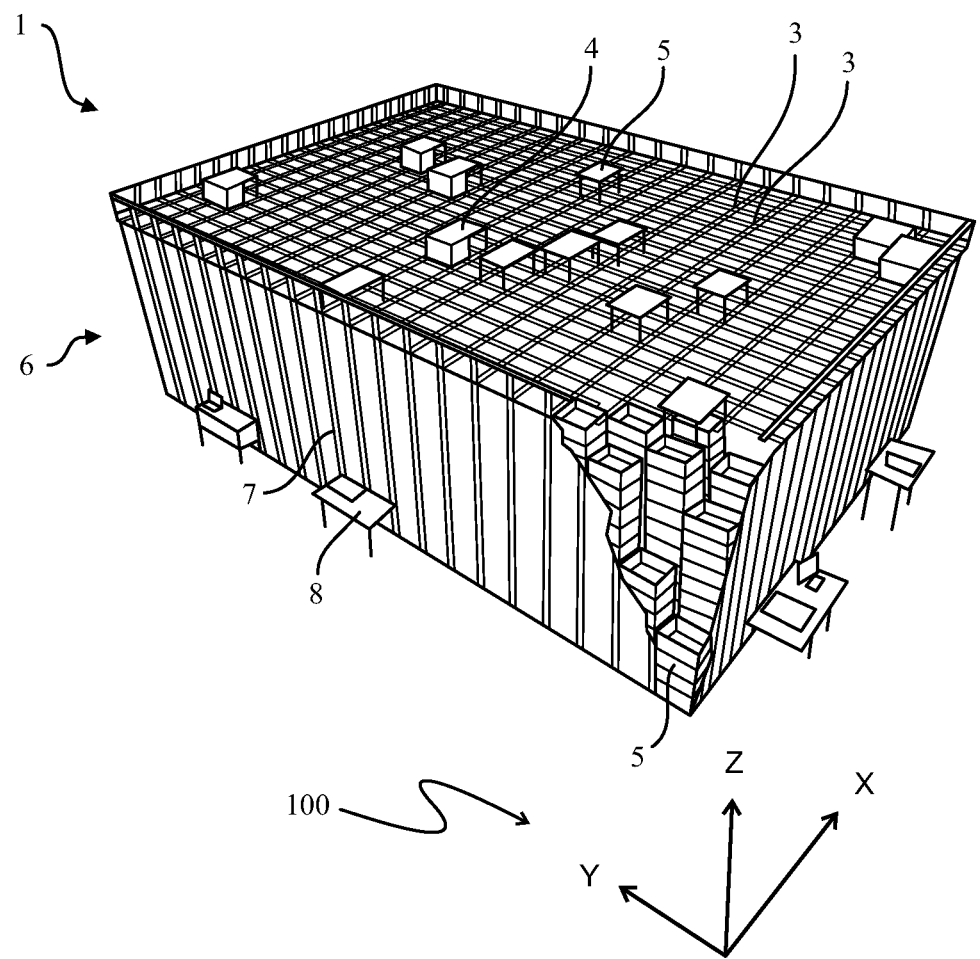
FIG. 1 is a perspective view of a prior art storage system suitable for a vehicle according to the invention.
Figure 2:
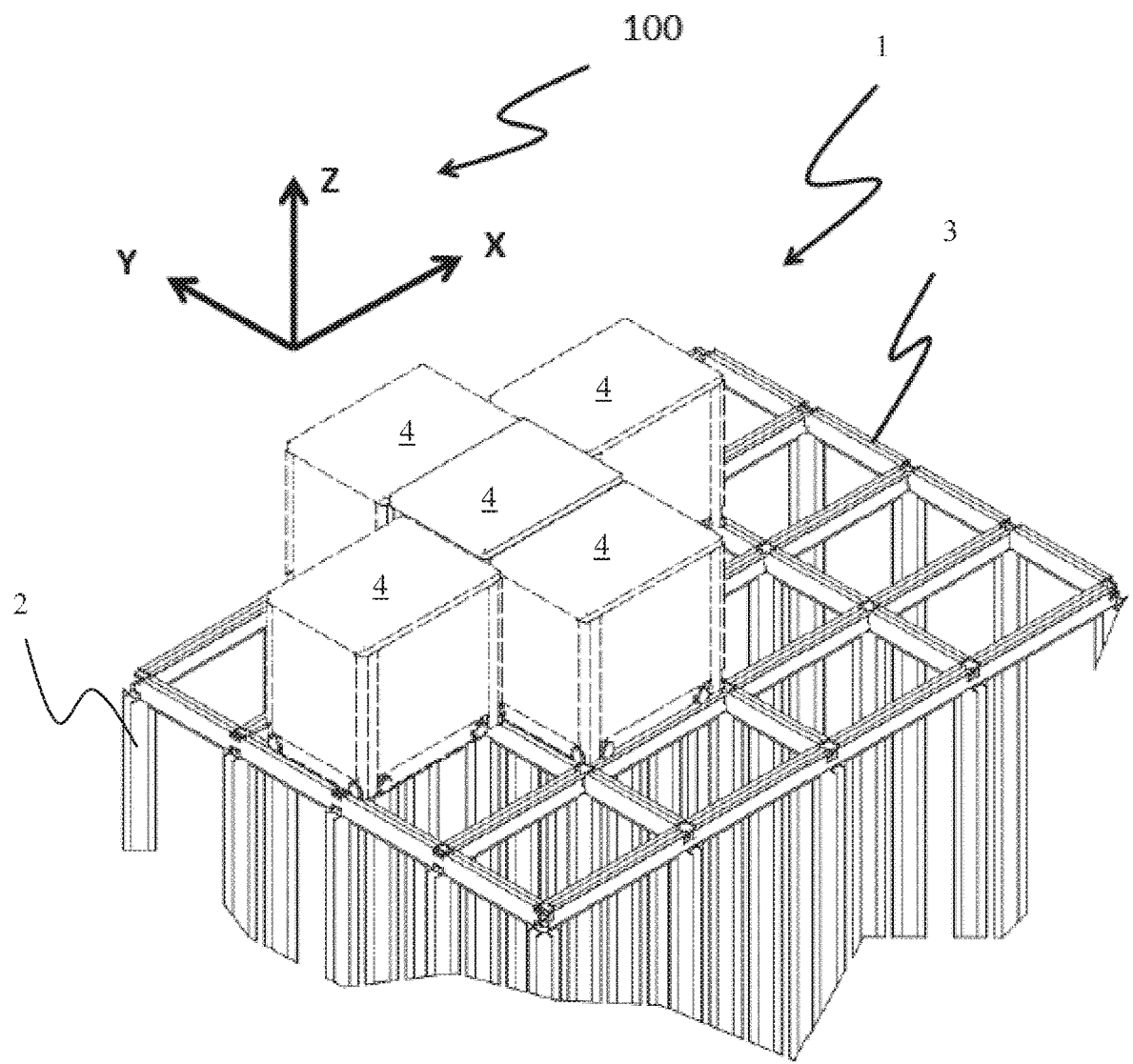
FIG. 2 is a perspective view of a prior art storage system showing details of the grid construction.
Figure 3:
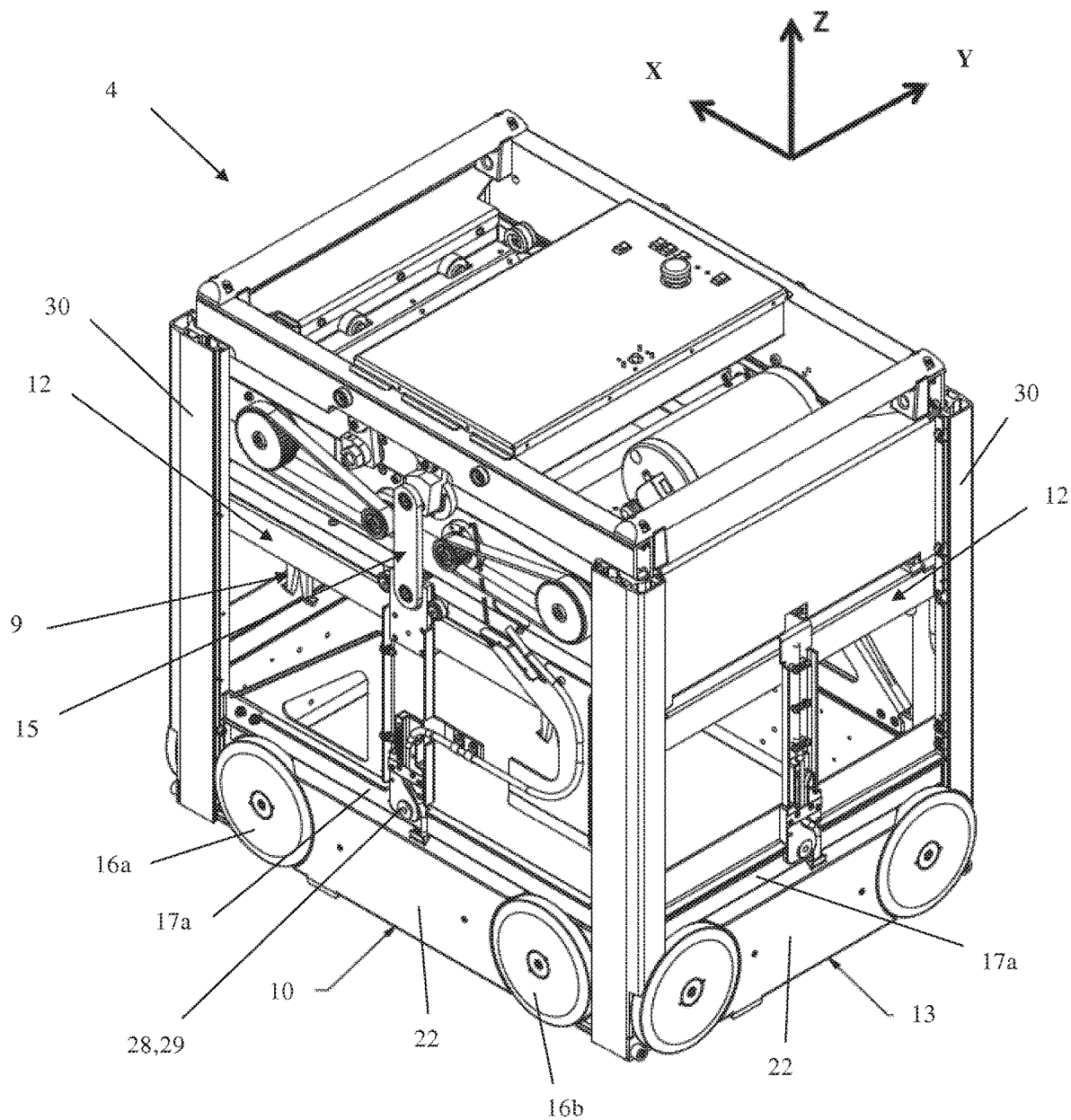
FIG. 3 is a perspective view of a vehicle according to the invention.

FIG. 2 shows part of a storage system 1 similar to the one shown in FIG. 1. However, in the storage system of FIG. 2, the remotely operated vehicles are different. In FIG. 1, the vehicles 4 are arranged in various neighbouring positions on top of the bin storing grid. In four of the five positions, the vehicle 4 is arranged directly above the grid's storage columns. The vehicles 4 are dimensioned so that the maximum cross-sectional area along the X-Y plane occupies not more than the cross sectional area of the corresponding (underlying) storage column. Hence, two or more vehicles 4 may be operated simultaneously above neighbouring columns of the grid.

An embodiment of a remotely operated vehicle according to the invention is shown in FIGS. 3-11. The vehicle 4 is for picking up storage bins 5 from an underlying storage system 1 (or storage grid 6). A part of the vehicle lifting device 9 used to lift and lower a storage bin is shown in FIG. 1. The vehicle features a first vehicle rolling assembly (10,11) arranged to allow movement of the vehicle along a first direction X, i.e. along the rails 3 extending in the direction X, and a second vehicle rolling assembly (13,14) arranged to allow movement of the vehicle in the direction Y. Each of the first vehicle rolling assembly and the second rolling assembly comprises a first rolling set 10,13 and a second rolling set 11,14 arranged at opposite sides of the vehicle frame 12 (or vehicle body). Each rolling set (10,11,13,14) comprises a first wheel 16a and a second wheel 16b rigidly interconnected by a wheel connecting element 17a,17b. The wheel connecting elements are partially covered by the cover plate 22, see FIG. 12.

The wheel connecting element 17a of the first rolling set 10 of the first vehicle rolling assembly is pivotally connected to the rolling set displacement assembly 15, while the first rolling set 13 of the second vehicle rolling assembly is pivotally connected to the vehicle frame 12. By having the wheel connecting element pivotally connected, each of said first rolling sets may tilt in a vertical plane. The first rolling set 10 of the first vehicle rolling assembly may tilt in a vertical plane parallel to the direction X, while the first rolling set 13 of the second vehicle rolling assembly may tilt in a vertical plane parallel to the direction Y, i.e. the first rolling sets of the first and second vehicle rolling assembly may tilt in respective perpendicular vertical planes.

Figure 4:
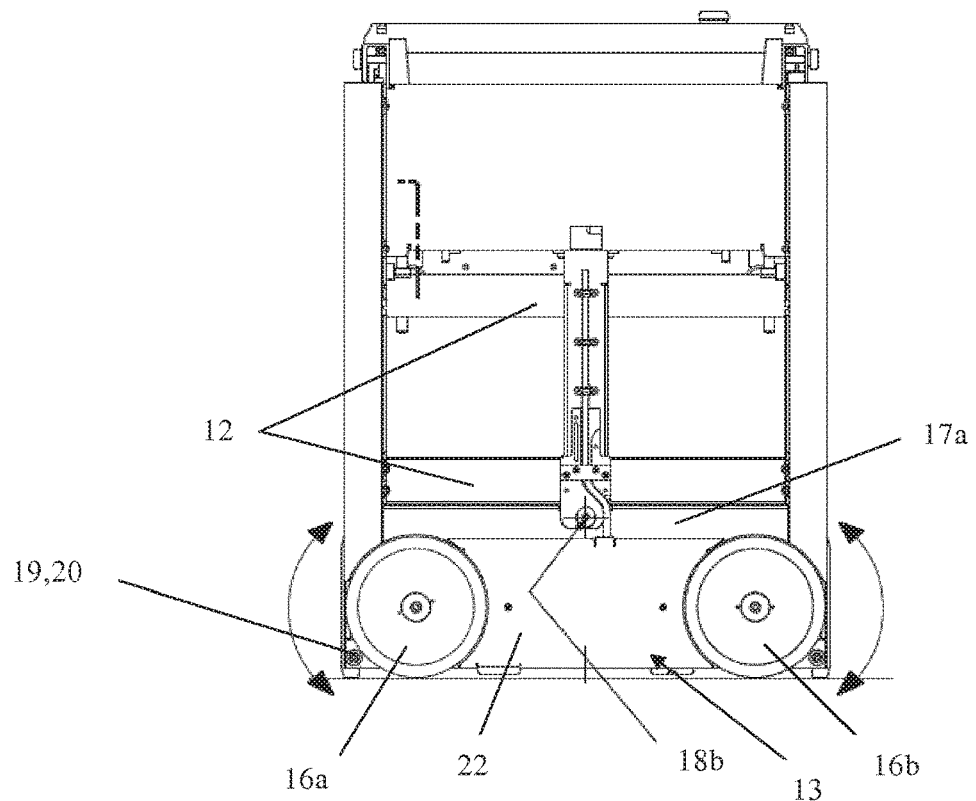
Figure 5:
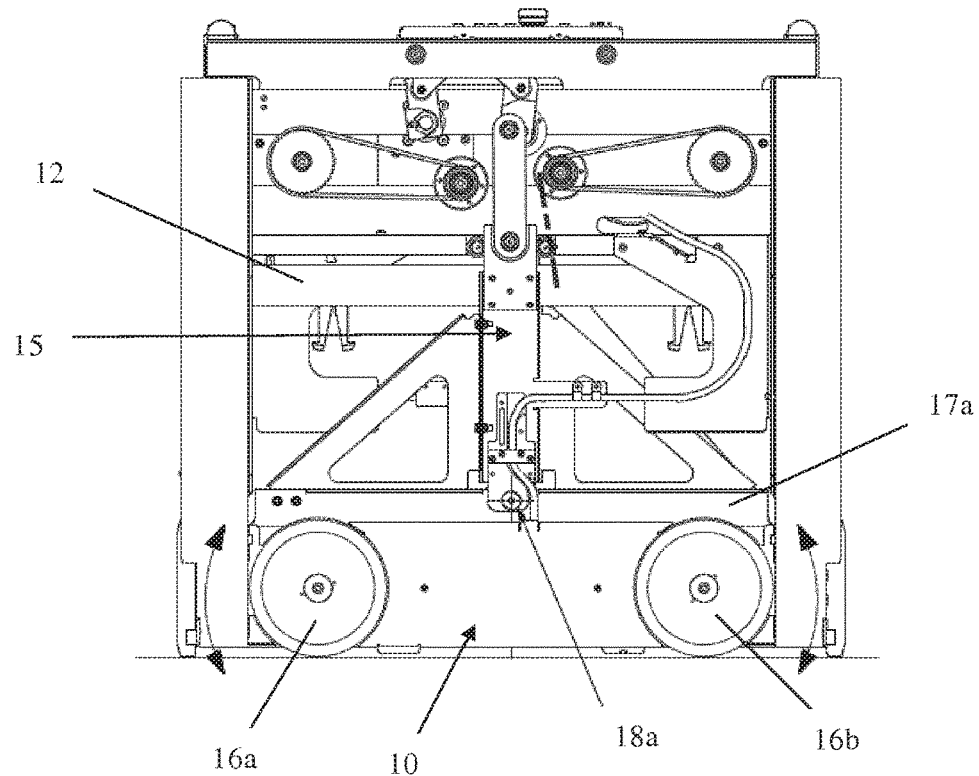
Figure 11:
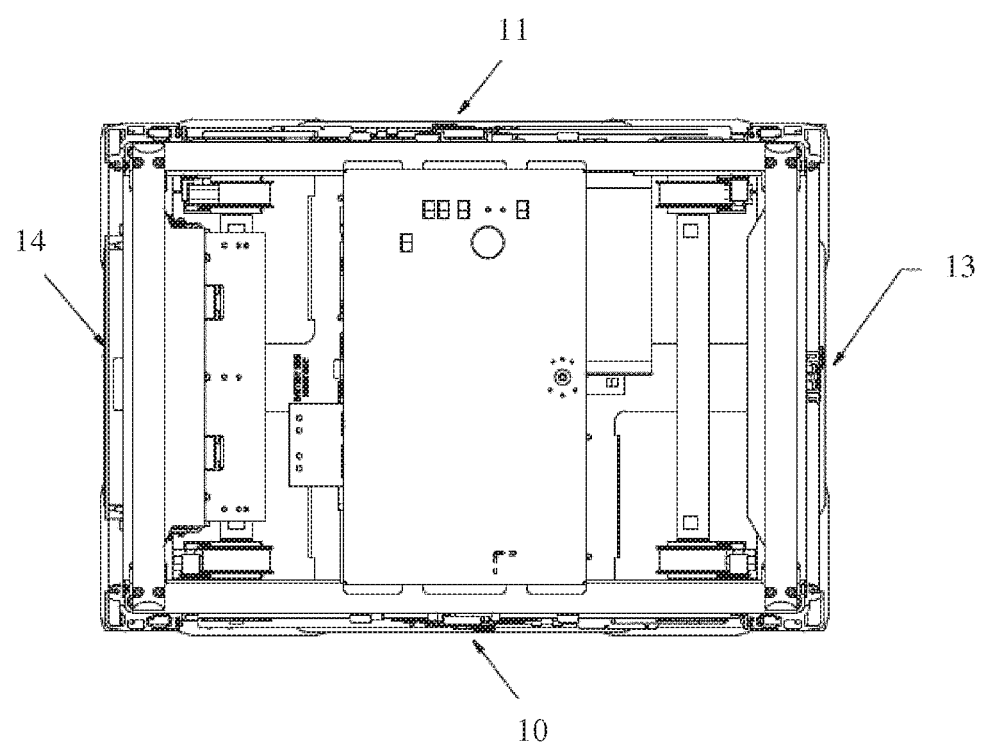
FIG. 11 is a top view of the vehicle in FIG. 3.

In the embodiment of FIGS. 3-11, the pivotable connections of the first rolling sets 10,13 comprise a shaft 28, a sleeve bearing 29 and a tilt limiting assembly 19,20. The tilt limiting assembly of the first rolling set 10 of the first vehicle rolling assembly is not visible in the figures as it is arranged behind the corner profiles 30 of the vehicle body. The centreline of the shaft is arranged at the corresponding pivot point 18a or 18b, ref. FIGS. 4 and 5. The tilt (or pivot movement) of the first rolling set (as a consequence of the tilt of the wheel connecting element 17a) is limited by the tilt limiting assembly 19,20 comprising a knob 20 (i.e. a second limiting element) and a circular hole 19 (i.e. a first limiting element) for accommodating the knob. In the tilt limiting assembly for the first rolling set 10 of the first vehicle rolling assembly, the knob 20 is fixed to the rolling set displacement assembly 15, while in the first rolling set 13 of the second vehicle rolling assembly, the knob is fixed to the vehicle frame 12. The circular hole 19 has a circumference larger than a cooperating circumference of the knob 20, such that the movement of the knob is limited by the circumference of the hole. The cooperating circumferences of the knob and hole are arranged to prevent the connecting element from tilting too far, i.e. ensuring that the lowermost contact surface 21 of the wheels in use are always kept below a lowermost part of the vehicle frame. A non-limiting example of a suitable maximum tilt is shown in FIG. 8, wherein the wheels of the first rolling set 13 of the second vehicle rolling assembly is able to tilt about 0.68 mm from the neutral level (i.e. the level of the wheels of the corresponding rigidly connected second rolling set 14), i.e. each wheel may move about 1.4 mm relative to the vehicle frame.

The rolling set displacement assembly 15 is arranged to move the first vehicle rolling assembly in a vertical direction Z between a first position, wherein the first vehicle rolling assembly allow movement of the vehicle 4 along the first direction X during use, and a second position, wherein the second vehicle rolling assembly allow movement of the vehicle 4 along the second direction Y. In other words, in the first position the wheels 16a, 16b of the first vehicle rolling assembly 10,11 are arranged at a level below the wheels of the second rolling assembly, such that the wheels (i.e. the lowermost contact surface 21, ref. FIG. 7) of the first rolling assembly are in contact with the top rails 3 extending in the first direction X. In the second position, the wheels 16a, 16b of the first vehicle rolling assembly 10,11 are arranged at a level above the wheels of the second rolling assembly, such that the wheels of the second rolling assembly are in contact with the top rails 3 extending in the second direction Y.

To prevent the whole vehicle from tilting permanently due to the tiltable/pivotable first rolling sets, the wheel connecting elements 17b of the second rolling set 11,14 of the first vehicle rolling assembly and the second vehicle rolling assembly are rigidly connected to the rolling set displacement assembly and the vehicle frame, respectively. That is, the wheel connecting elements 17b of the second rolling set of the first vehicle rolling assembly and the second vehicle rolling assembly are not able to tilt/pivot. In this specific embodiment, the wheel connecting elements of the second rolling sets are similar to the wheel connecting element of the first rolling sets. However, since the wheel connecting elements of the second rolling sets are not required to be pivotably connected, said wheel connecting elements may also constitute an integral or rigidly connected part of for instance the vehicle frame or the rolling set displacement assembly.

In this particular embodiment, the wheel connecting elements 17b of the second rolling sets 11,14 are rigidly connected by a rigid assembly similar to the tilt limiting assembly used for the tiltable wheel connecting elements 17a of the first rolling sets 10,13. However, in the rigid assembly, the cooperating circumferences of the knob and the corresponding circular hole are dimensioned such that the knob is not movable relative to the hole, i.e. the circumferences allows the knob to be inserted into the hole, but not to move in relation to it.

The effect of having the first rolling sets 10,13 able to tilt is that all the wheels of the first or second vehicle rolling assembly are in contact with the top rails even when some of the aluminium beams/profiles 2 have height differences as discussed in the background section.

Further, it is noted that based on the present specification, the skilled person would easily recognize that the first rolling sets and the second rolling sets may be pivotally or rigidly connected, respectively, in a number of ways obvious to the skilled person.

In the vehicle 4 shown in FIGS. 3-11, the wheels 16a,16b of the first and the second vehicle rolling assembly are all independently driven by an electric motor. Preferably, each wheel is driven by a separate dedicated motor as shown in FIGS. 12-14.

Figure 12:
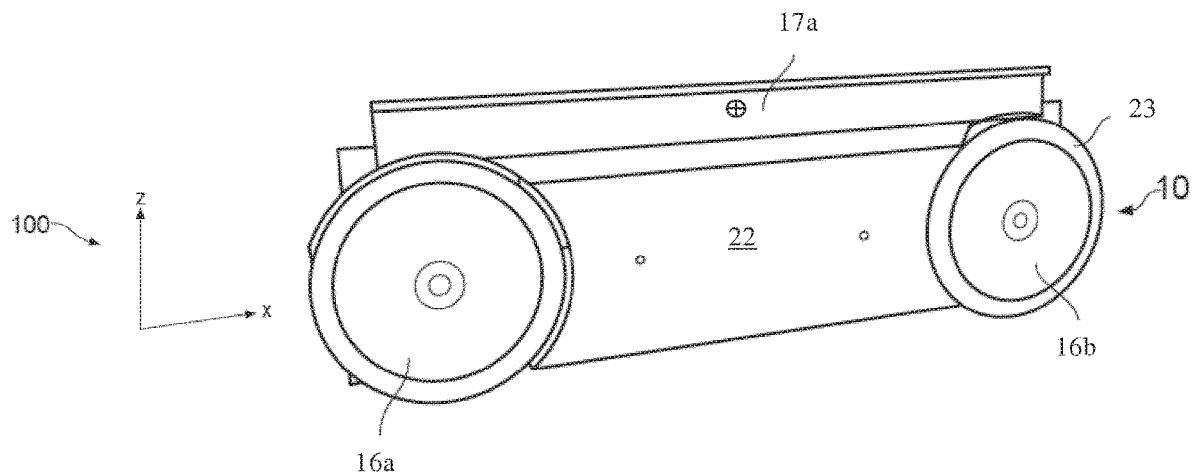
FIGS. 12-14 show details of a rolling set featuring a motor assembly for each wheel.

One side of the first vehicle rolling assembly, i.e. the first rolling set 10, is illustrated in FIG. 12 in a perspective side view. The rolling set 10 comprises in this particular embodiment of the invention two wheels 16a,16b with outer rims/edges 23 situated near the corners of the vehicle along the X-direction. A cover plate 22 is arranged between the two wheels 16a,16b.

Figure 13:
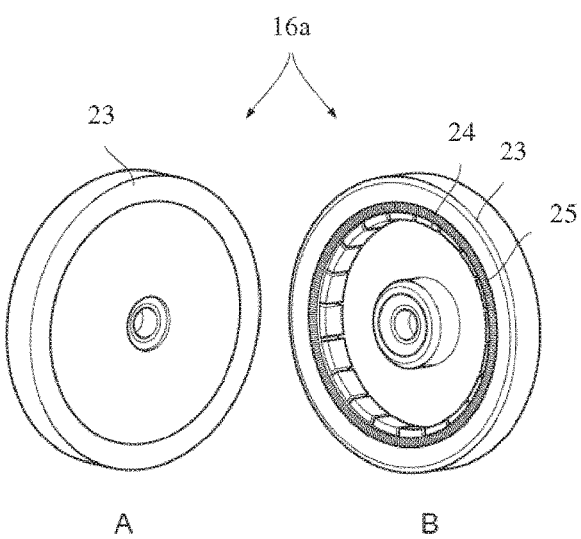

Further details of one of the wheels 16a are provided in FIG. 13 A and B, showing the outer side and the inner side, respectively. The remaining wheels of the vehicle have the same technical features. In FIG. 13 B a rotary encoder 25 of type optical rotary quadrature encoder has been arranged within the inner radial surface of the outer rim 23. Other types of encoders may be used such as magnetic encoders, linear encoders, voltage based analog encoders, etc. A rotor 24, in FIG. 13 B shown as a set of permanent magnets 24, is arranged inside the circumference set up by the rotary encoder 25, i.e. closer to the rotational axis of the wheel 16a.

Figure 14:
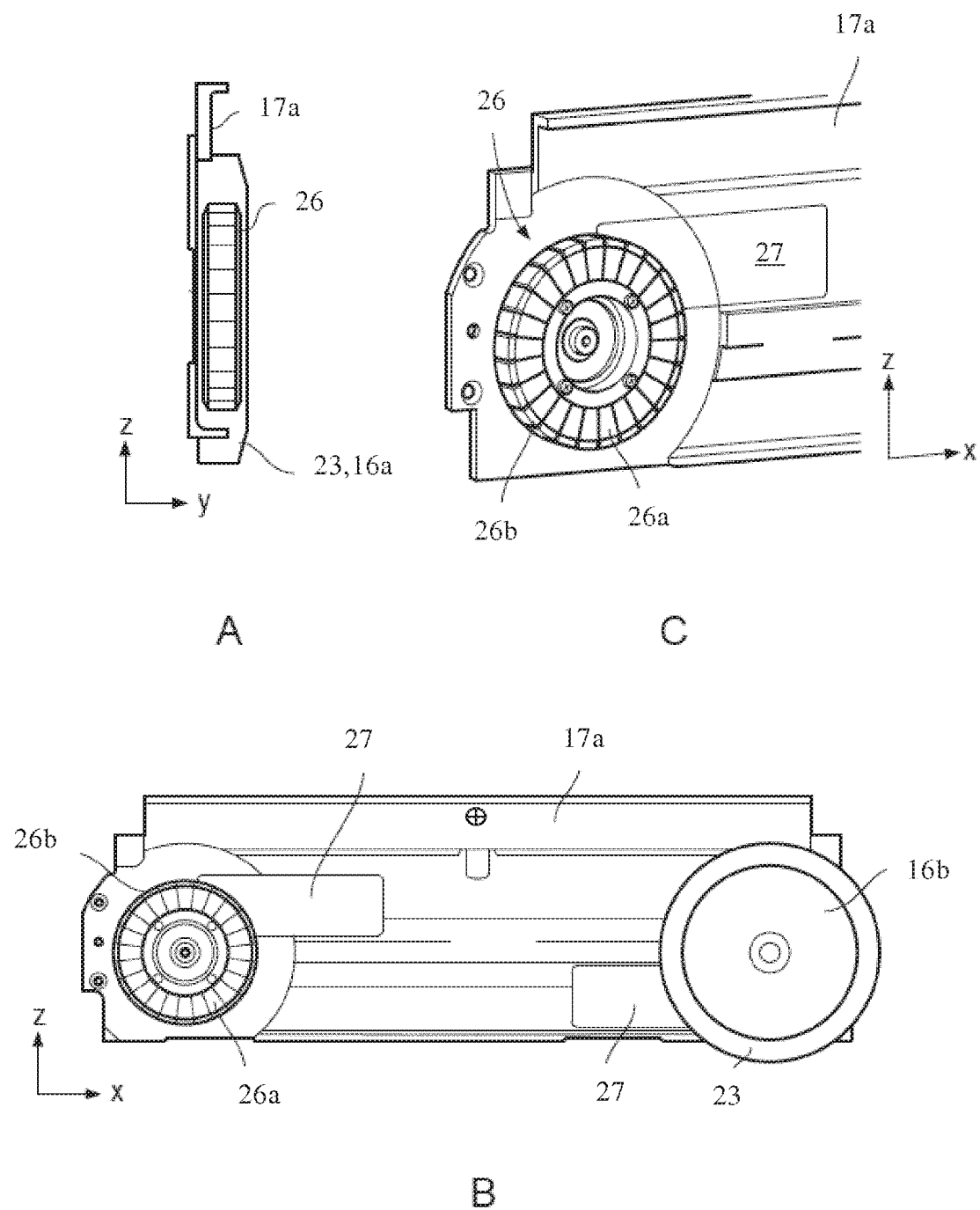

The corresponding stator 26 is seen in FIG. 14 A in the form of electrical windings 26a wrapped around yokes 26b. However, a skilled person will understand that the stator 26 and rotor 24 may be configured with stator magnets and rotor yokes/windings, respectively.

FIGS. 14 B and C also illustrate an arrangement where means for measuring acceleration 27 is connected in signal communication with the stators 26 of each wheel 16a,16b, for example by use of piezoelectric sensors. FIG. 14 A is a cross section of part of the first rolling assembly 10 seen along the X-direction, illustrating stator 26 being enclosed by the outer rim 23.

The fact that the driving means 24,26 are arranged near or within the wheels 16a,16b of the vehicle 4 contributes to liberate space within the vehicle, thereby allowing a compact design.

The feature of having each wheel independently driven by a dedicated motor is considered highly advantageous. However, the inventive feature of having the first rolling sets pivotably connected is also advantageous for vehicles, wherein the wheels of the rolling sets are driven by at least one motor common for two or more wheels, since the pivot connection ensures that all the wheels are in contact with the top rails of a storage system at all times.

All operations of the vehicle 4 are controlled by wireless communication means and remote-control units. This includes one or more of control of the vehicle movement, control of the vehicle lifting device 7, measurements of vehicle positions, measurements of vehicle velocities and measurements of vehicle accelerations.

In the preceding description, various aspects of the vehicle 4 and the storage system according to the invention have been described with reference to illustrative embodiments. For purposes of explanation, systems and configurations were set forth in order to provide a thorough understanding of the system and its workings. However, this description is not intended to be construed in a limiting sense. Various modifications and variations of the illustrative embodiments, as well as other embodiments of the system, which are apparent to persons skilled in the art to which the disclosed subject matter pertains, are deemed to lie within the scope of the present invention.

The invention claimed is:

1. A remotely operated vehicle for picking up storage bins from an underlying storage system, comprising:
   a vehicle lifting device for lifting the storage bin from the underlying storage system,
   a first vehicle rolling assembly comprising a first rolling set and a second rolling set arranged at opposite sides of a vehicle frame, allowing movement of the vehicle along a first direction (X) on the underlying storage system during use, and
   a second vehicle rolling assembly comprising a first rolling set and a second rolling set arranged at opposite sides of the vehicle frame, allowing movement of the vehicle along a second direction (Y) on the underlying storage system during use, the second direction (Y) being perpendicular to the first direction (X),
   a rolling set displacement assembly arranged to move the first vehicle rolling assembly in a vertical direction (Z) between a first position, wherein the first vehicle rolling assembly allow movement of the vehicle along the first direction (X), and a second position, wherein the second vehicle rolling assembly allow movement of the vehicle along the second direction (Y),
   wherein each of said rolling sets comprises at least a first wheel and a second wheel rigidly interconnected by a wheel connecting element,
   wherein the wheel connecting element of the second rolling set of the first vehicle rolling assembly is rigidly connected to the rolling set displacement assembly, and the wheel connecting element of the second rolling set of the second vehicle rolling assembly is rigidly connected to the vehicle frame,
   wherein the wheel connecting element of the first rolling set of the first vehicle rolling assembly is pivotally connected to the vehicle frame via the rolling set displacement assembly, and the wheel connecting element of the first rolling set of the second vehicle rolling assembly are pivotally connected to the vehicle frame, such that the wheel connecting element of the first rolling set of the first vehicle rolling assembly may tilt in a vertical plane parallel to the first direction (X), and the wheel connecting element of the first rolling set of the second vehicle rolling assembly may tilt in a vertical plane parallel to the second direction (Y).

2. The vehicle according to claim 1, wherein the tilt of the wheel connecting element of the first rolling set of the first and the second vehicle rolling assembly is limited by a tilt limiting assembly.

3. The vehicle according to claim 2, wherein the tilt limiting assembly is arranged to prevent a lowermost contact surface, of the wheels of the first rolling set driving the vehicle, from tilting above a level of a lowermost part of the vehicle frame.

4. The vehicle according to claim 3, wherein the tilt limiting assembly comprises a first limiting element on each of the wheel connecting elements of the first rolling set of the first and of the second vehicle rolling assembly, and a cooperating second limiting element on each of the rolling set displacement assembly and the vehicle frame.

5. The vehicle according to claim 4, wherein the first limiting element is a hole and the second limiting element is a knob, the hole having a circumference larger than the circumference of the knob, such that the knob may move a given distance relative to the hole.

6. The vehicle according to claim 2, wherein the tilt limiting assembly comprises a first limiting element on each of the wheel connecting elements of the first rolling set of the first and of the second vehicle rolling assembly, and a cooperating second limiting element on each of the rolling set displacement assembly and the vehicle frame.

7. The vehicle according to claim 6, wherein the first limiting element is a hole and the second limiting element is a knob, the hole having a circumference larger than the circumference of the knob, such that the knob may move a given distance relative to the hole.

8. The vehicle according to claim 1, wherein the wheel connecting element of the first rolling set of the first vehicle rolling assembly and the second vehicle rolling assembly is pivotally connected at a first pivot point and a second pivot point, respectively, the first and the second pivot point being equidistant from the centre axis of the first and the second wheel of the respective rolling set.

9. The vehicle according to claim 1, wherein each wheel is independently driven by a motor.

10. A storage system comprising a vehicle according to claim 1, the storage system comprises a bin storage structure having a plurality of storage columns for accommodating a vertical stack of storage bins and a horizontal grid of top rails upon which the vehicle may move in two perpendicular directions above the storage columns.

11. The vehicle according to claim 1, wherein each wheel is independently driven by a separate electric motor.

* * * * *